US006480808B1

(12) United States Patent
Early et al.

(10) Patent No.: US 6,480,808 B1
(45) Date of Patent: Nov. 12, 2002

(54) METHOD AND APPARATUS FOR CALCULATING CONFIDENCE INTERVALS

(75) Inventors: Thomas Alan Early, Clifton Park, NY (US); Necip Doganaksoy, Clifton Park, NY (US); John Anthony DeLuca, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/576,680

(22) Filed: May 23, 2000

Related U.S. Application Data

(60) Provisional application No. 60/171,471, filed on Dec. 22, 1999.

(51) Int. Cl.[7] ............................................. G06F 101/14
(52) U.S. Cl. ..................................... 702/179; 702/181
(58) Field of Search ................... 73/504.04; 235/70 R; 364/468, 468.01, 468.16, 554; 435/6; 438/14; 700/97; 705/28; 707/6, 7; 716/4

(56) References Cited

U.S. PATENT DOCUMENTS

| | | | | |
|---|---|---|---|---|
| 5,301,118 A | * | 4/1994 | Heck et al. ................... 364/468 |
| 5,452,218 A | * | 9/1995 | Tucker et al. ................. 364/468 |
| 5,581,466 A | * | 12/1996 | Van Wyk et al. ........ 364/468.01 |
| 5,715,181 A | * | 2/1998 | Horst .......................... 364/554 |
| 5,731,572 A | * | 3/1998 | Winn ........................ 235/70 R |
| 5,777,841 A | * | 7/1998 | Stone et al. ................. 364/554 |
| 5,956,251 A | * | 9/1999 | Atkinson et al. ....... 364/468.16 |
| 6,015,667 A | * | 1/2000 | Sharaf ............................ 435/6 |
| 6,065,005 A | * | 5/2000 | Gal et al. ....................... 707/7 |
| 6,182,070 B1 | * | 1/2001 | Megiddo et al. ................ 707/6 |
| 6,184,048 B1 | * | 2/2001 | Ramon ........................ 438/14 |
| 6,253,115 B1 | * | 6/2001 | Martin et al. ................ 700/97 |
| 6,257,057 B1 | * | 7/2001 | Hulsing, II ............... 73/504.04 |
| 6,298,470 B1 | * | 10/2001 | Breiner et al. .................. 716/4 |
| 6,341,271 B1 | * | 1/2002 | Salvo et al. .................... 705/28 |

OTHER PUBLICATIONS

Smith, B;"Six–Sigma Design"; IEEE Spectrum; vol. 30 Issue 9; 1993; pp 43–47.*

Horst, R L;"Making Ther Six–Sigma Leap Using SPC Data";IEEE 24th Electronics Manufacturing Technology Symposium; 1999; pp 50–53.*

Hoehn, W K;"Robust Designs Through Design To Six–Sigma Manufacturability";Proceedings IEEE Annual International Engineering Management Conference, Global Engineering Management Emerging Trends In The Asia Pacific; 1995; pp 241–246.*

Higge, P B;"A Quality Process Approach To Electronic Systems Reliability"; Proceedings IEEE Reliability And Maintainability Symposium; 1993; pp 100–105.*

* cited by examiner

Primary Examiner—John S. Hilten
Assistant Examiner—Douglas N Washburn
(74) Attorney, Agent, or Firm—Noreen C. Johnson; Christian G. Cabou

(57) ABSTRACT

An exemplary embodiment of the invention is a method and apparatus for calculating at least one confidence interval. The method comprises activating a calculator. The calculator prompts the user to enter at least three pairs of calibration data. The user then specifies a reference for the calibration data. The calculator then generates a list of the calibration data. The calculator then calculates a linear calibration curve derived from the calibration data. The calculator then calculates a residual calibration value plot derived from the calibration data. The user enters an unknown sample output measurement. The calculator calculates a back-calculated unknown sample input measurement. The calculator lastly calculates a confidence interval for the back-calculated unknown sample input measurement.

8 Claims, 6 Drawing Sheets

FIG. 3

| | | | | |
|---|---|---|---|---|
| Slope | 0.01122955 | -0.00163276 | Intercept | |
| Slope Error | 0.00018773 | 0.004211603 | Intercept Error | |
| $R^2$ | 99.89% | 0.006463613 | Standard Error | |
| F | 3578.06669 | 4 | dF | |
| $SS_{regression}$ | 0.1494855 | 0.000167113 | $SS_{residual}$ | |

| Concentration | Intensity | Calculated | Residual | Norm Resid. |
|---|---|---|---|---|
| 0 | 0.00224504 | -0.00163276 | 0.003878 | 0.600 |
| 4.996 | 0.05192716 | 0.054470071 | -0.002543 | -0.393 |
| 9.991 | 0.10254634 | 0.110561671 | -0.008015 | -1.240 |
| 19.983 | 0.23157251 | 0.222767329 | 0.008805 | 1.362 |
| 29.974 | 0.3347869 | 0.334961757 | -0.000175 | -0.027 |
| 39.965 | 0.4452063 | 0.447156186 | -0.00195 | -0.302 |

FIG. 7

Customer: *Kim Customer*
Comment: *A demonstration*
Date: 6-Aug-98

Calibration Parameters
- Standard Error: 0.006464
- Slope: 0.01123
- Intercept: -0.001633
- Average x: 17.48483
- $\Sigma(x-\bar{x})^2$: 1185.426 # of Samples: 12

Sample Data

| N | Sample | Intensity | Concentration | Std. Err. | 90% PI | 95% PI | 99% PI |
|---|--------|-----------|---------------|-----------|--------|--------|--------|
| 1 | 3-1 | 0.2274 | 20.3913 | 0.6236 | ±1.3294 | ±1.7314 | ±2.8711 |
| 1 | 3-2 | 0.2267 | 20.3315 | 0.6235 | ±1.3293 | ±1.7312 | ±2.8708 |
| 1 | 3-3 | 0.2277 | 20.4181 | 0.6236 | ±1.3295 | ±1.7315 | ±2.8713 |
| 1 | 3-4 | 0.2284 | 20.4860 | 0.6237 | ±1.3297 | ±1.7318 | ±2.8717 |
| 1 | 3-5 | 0.2291 | 20.5457 | 0.6238 | ±1.3299 | ±1.7320 | ±2.8721 |
| 1 | 3-6 | 0.2297 | 20.5984 | 0.6239 | ±1.3300 | ±1.7322 | ±2.8724 |
| 1 | 4-1 | 0.2155 | 19.3362 | 0.6225 | ±1.3270 | ±1.7283 | ±2.8659 |
| 1 | 4-2 | 0.2181 | 19.5670 | 0.6227 | ±1.3275 | ±1.7288 | ±2.8669 |
| 1 | 4-3 | 0.2217 | 19.8913 | 0.6230 | ±1.3282 | ±1.7298 | ±2.8684 |
| 1 | 4-4 | 0.2206 | 19.7938 | 0.6229 | ±1.3279 | ±1.7295 | ±2.8679 |
| 1 | 4-5 | 0.2210 | 19.8224 | 0.6229 | ±1.3280 | ±1.7295 | ±2.8680 |
| 1 | 4-6 | 0.2188 | 19.6330 | 0.6227 | ±1.3276 | ±1.7290 | ±2.8672 |

METHOD AND APPARATUS FOR CALCULATING CONFIDENCE INTERVALS

This present application claims benefit of U.S. Provisional Application Ser. No. 60/171,471, entitled "Method and Apparatus for Calculating Confidence Intervals", filed on Dec. 22, 1999 in the name of Early, et al.

A portion of the disclosure of this patent document contains material that is subject to copyright protection. The copyright owner has no objection to the facsimile production by any one of the patent disclosure, as it appears in the Patent and Trademark Office files or records, but otherwise reserver all copyrights rights whatsoever.

The present application is related to copending U.S. patent application Ser. No. 09/576,988, entitled "Method and Apparatus for Calculating Confidence Intervals," filed on May 23, 2000 in the name of Early, copending U.S. patent application Ser. No. 09/576,688, entitled "Method and Apparatus for Calculating Confidence Intervals," filed on May 23, 2000 in the name of Early, and copending U.S. patent application Ser. No. 09/617,940, entitled "Method of Confidence Scoring," filed on Aug. 25, 2000 in the name of Wakeman et al.

BACKGROUND OF THE INVENTION

A portion of the disclosure of this patent document contains material that is subject to copyright protection. The copyright owner has no objection to the facsimile production by any one of the patent disclosure, as it appears in the Patent and Trademark Office files or records, but otherwise reserves all copyrights rights whatsoever.

This invention relates to a prediction interval calculator and, more particularly, to a calculator that performs a complete statistical analysis of output data according to Six Sigma.

With the advent of the worldwide marketplace and the corresponding consumer demand for highly reliable products, quality has become an increasingly important issue. The quality of a company's product line can therefore play a decisive role in determining the company's reputation and profitability. As a result of this pressure for defect-free products, increased emphasis is being placed on quality control at all levels; it is no longer just an issue with which quality control managers are concerned. This has led to various initiatives designed to improve quality, such as the Total Quality Management (TQM) and the Six Sigma quality improvement programs. An overview of the Six Sigma program is presented by Mikel J. Harry and J. Ronald Lawson in "Six Sigma Producibility Analysis and Process Characterization," Addison Wesley Publishing Co., pp. 1-1 through 1-5, 1992. The Six Sigma program is also thoroughly discussed by G. J. Hahn, W. J. Hill, R. W. Hoerl, and S. A. Zinkgraf in "The Impact of Six Sigma Improvement - A Glimpse into the Future of Statistics", The American Statistician, 53, 3, August, pages 208–215; and by G. J. Hahn, N. Doganaksoy, and R. Hoerl in "The Evolution of Six Sigma", to appear in Quality Engineering, March 2000 issue.

Six Sigma analysis is a data driven methodology to improve the quality of products and services delivered to customers. Decisions made regarding direction, interpretation, scope, depth or any other aspect of quality effort should be based on actual data gathered, and not based on opinion, authority or guesswork. Key critical-to-quality (CTQ) characteristics are set by customers. Based on those CTQs, internal measurements and specifications are developed in order to quantify quality performance. Quality improvement programs are developed whenever there is a gap between the customer CTQ expectations and the current performance level.

The basic steps in a quality improvement project are first to define the real problem by identifying the CTQs and related measurable performance that is not meeting customer expectations. This real problem is then translated into a statistical problem through the collection of data related to the real problem. By the application of the scientific method (observation, hypothesis and experimentation), a statistical solution to this statistical problem is arrived at. This solution is deduced from the data through the testing of various hypotheses regarding a specific interpretation of the data. Confidence (prediction) intervals provide a key statistical tool used to accept or reject hypotheses that are to be tested. The arrived at statistical solution is then translated back to the customer in the form of a real solution.

In common use, data is interpreted on its face value. However, from a statistical point of view, the results of a measurement cannot be interpreted or compared without a consideration of the confidence that measurement accurately represents the underlying characteristic that is being measured. Uncertainties in measurements will arise from variability in sampling, the measurement method, operators and so forth. The statistical tool for expressing this uncertainty is called a confidence interval depending upon the exact situation in which the data is being generated.

Confidence interval refers to the region containing the limits or band of a parameter with an associated confidence level that the bounds are large enough to contain the true parameter value. The bands can be single-sided to describe an upper or lower limit or double sided to describe both upper and lower limits. The region gives a range of values, bounded below by a lower confidence limit and from above by an upper confidence limit, such that one can be confident (at a pre-specified level such as 95% or 99%) that the true population parameter value is included within the confidence interval. Confidence intervals can be formed for any of the parameters used to describe the characteristic of interest. In the end, confidence intervals are used to estimate the population parameters from the sample statistics and allow a probabilistic quantification of the strength of the best estimate.

In the case of the invention described herein, the calculated prediction intervals describe a range of values which contain the actual value of the sample at some given double-sided confidence level. For example, the present invention allows the user to change a statistically undependable statement, "There is 5.65 milligrams of Element Y in sample X", to, "There is 95% confidence that there is 5.65+/−0.63 milligrams of Element Y in sample X". A prediction interval for an individual observation is an interval that will, with a specified degree of confidence, contain a randomly selected observation from a population. The inclusion of the confidence interval at a given probability allows the data to be interpreted in light of the situation. The interpreter has a range of values bounded by an upper and lower limit that is formed for any of the parameters used to describe the characteristic of interest. Meanwhile and at the same time, the risk associated with and reliability of the data is fully exposed allowing the interpreter access to all the information in the original measurement. This full disclosure of the data can then be used in subsequent decisions and interpretations of which the measurement data has bearing.

Current devices for performing statistical linear analysis do not generate enough parameters to calculate confidence intervals for the measured values. To calculate these parameters can be cumbersome, even if a hand-held calculator is used. To avoid the inconvenience of using calculators, look-up tables are often used instead, in which the various parameters of interest are listed in columns and correlated with each other. Nevertheless, these tables do not provide the user with enough flexibility, e.g., it is generally necessary to interpolate between the listed values. Furthermore, the user is not presented information in a way that is interactive, so that a "feel" for the numbers and the relationship of the various quantities to each other is lost.

Thus, there is a particular need for an apparatus and method for calculating confidence intervals for Six Sigma analysis.

BRIEF SUMMARY OF THE INVENTION

In an exemplary embodiment of the invention, a method for calculating confidence intervals comprises activating a calculator. The user then enters at least three pairs of calibration data. The user specifies at least one reference for the at least three pairs of calibration data. The calculator generates a list of the at least three pairs of calibration data. The calculator also calculates at least one linear calibration curve derived from the at least three pairs of calibration data. The calculator calculating at least one residual calibration value plot derived from the at least three pairs of calibration data. The user next enters at least one unknown sample output measurement. The calculator calculates at least one back-calculated unknown sample input measurement. The calculator then calculates at least one confidence interval for the at least one back-calculated unknown sample input measurement.

In another exemplary embodiment of the invention, an apparatus comprises a set of instructions for calculating at least one confidence interval value.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings in which:

FIG. 3 is a calibration data chart containing calibration standard plot data and a calibration standard summary;

FIG. 7 is a sample data chart of the calculator.

DETAILED DESCRIPTION OF THE INVENTION

Generally, devices for performing statistical linear analysis contain procedures for processing data files. The primary purpose of these procedures is to provide complete data analysis of all sample measurements. Some of these calculations are routinely performed and output by the instrument, but certain analysis required for Six Sigma is not included in the data output.

Specifically, the invention utilizes procedures for calculating confidence intervals of unknown sample input characteristic or x values based on the unknown's y reading and the current calibration of the device.

Figure 1:
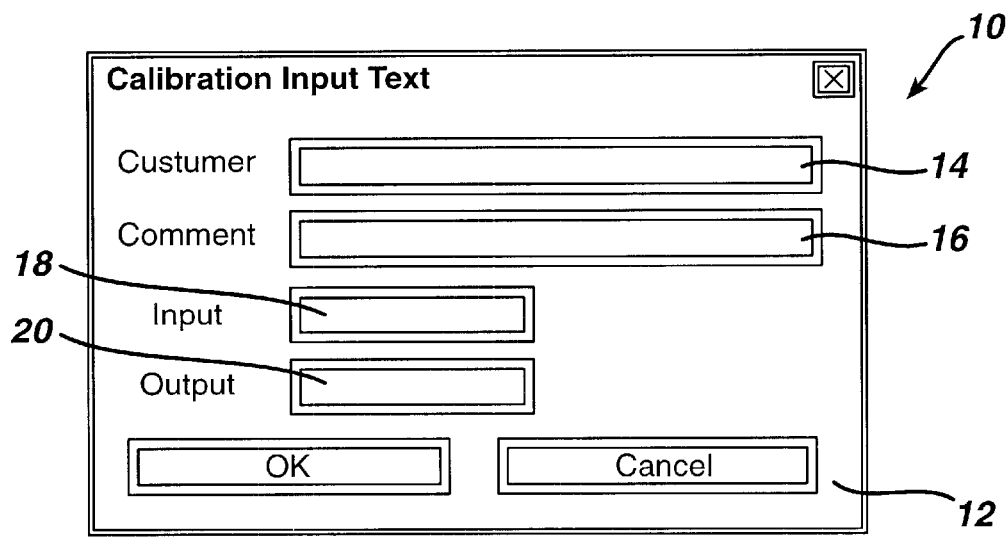
FIG. 1 is a calibration input text box of the calculator.

Referring now to FIG. 1, an exemplary embodiment of a calculator 10 comprises a set of instructions for calculating confidence intervals of an unknown sample input characteristic based on the unknown sample's output measurement. Calculator 10 is preferably a macro of a spreadsheet program such as Excel®, Lotus®, or any Windows® based spreadsheet program. The exemplary embodiment of the present invention allows calculator 10 to be opened when needed or placed in an Excel® start directory, Lotus® start directory, or any Windows® based spreadsheet program directory so that it will read each time the program is started. Calculator 10 may be used on any Windows based PC or any instrumentation or hardware the user may use to perform statistical analysis in accordance with Six Sigma.

In the exemplary embodiment of the present invention calculator 10 prompts the user to a first dialog box 12. First dialog box 12 is preferably labeled Calibration Input Text. The user is prompted at first dialog box 12 for basic information about the data such as a customer value 14 and a comment 16. Customer value 14 and comment 16 are included to meet the user's internal requirements. The user is then prompted for a calibration input characteristic 18 and a calibration output measurement 20. Calibration input characteristic 18 corresponds to the x-value of the calibration standards. Calibration output measurement 20 corresponds to the y-value of the calibration samples. Calibration input characteristic 18 and calibration output measurement 20 are readings generated during analysis of the calibration standards by the device. When more than one calibration output measurement 20 is recorded, user may enter multiple calibration output measurements 20 as a comma-separated list under the prompt "Y Unit" of first dialog box 12. User may navigate through the previously entered data of first dialog box 12 to check, update and delete previously entered data once more than one pair of x and y values of calibration standards are entered.

Figure 2:
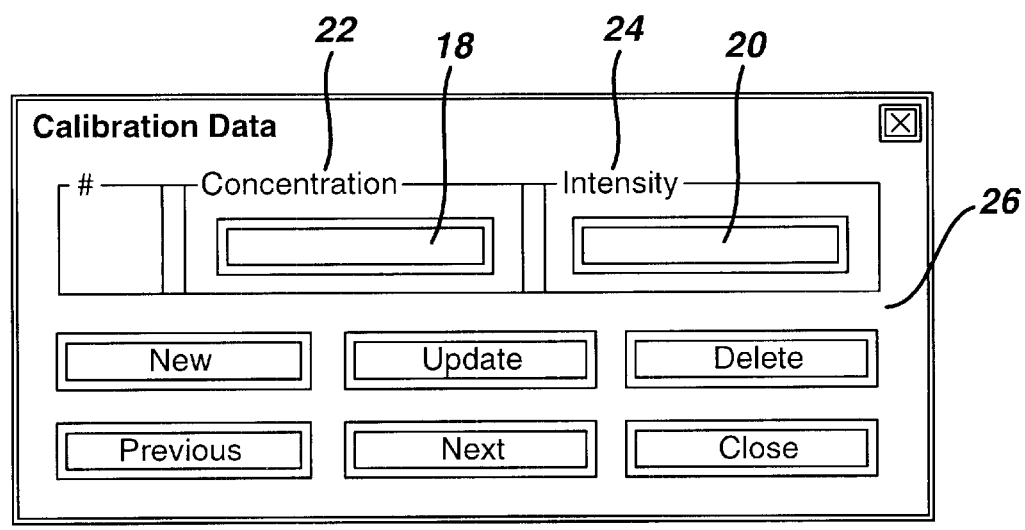
FIG. 2 is a calibration data box of the calculator.

Referring now to FIG. 2, user specifies a reference 22 for calibration input characteristic 18 and a reference 24 for calibration output measurement 20 in a second dialog box 26, also referred to as Calibration Data. In the exemplary embodiment of the present invention, reference 22 represents the "Concentration" readings or x-values of the calibration standards and reference 24 represents the "Intensity" readings or y-values of the calibration standards. User may navigate through the previously entered data of second dialog box 26 to check, update and delete previously entered data.

Referring now to FIG. 3, calibration worksheet 28 lists a calibration standard plot data 30 and a calibration standard summary 32. Calibration standard plot data 30 includes the following parameters: Slope 38, Slope Error 40, R-squared value 42 ("$R^2$"), F 44, $SS_{regression}$ 46, Intercept 48, Intercept Error 50, Standard Error 52, dF 54, and $SS_{residual}$ 56 (FIG. 3). The slope value, slope error value, $R^2$ value, F value, $SS_{regression}$ value, intercept value, intercept error value, standard error value, dF value, and $SS_{residual}$ value are standard statistical notations. These statistical notations are further defined throughout *Applied Regression Analysis*, by Norman Draper and Harry Smith, Third Edition, Wiley, 1998. Accordingly, the parameters may change according to the specifications and requirements of the application for which the exemplary embodiment of the present invention is being used.

Calibration standard summary 32 includes a summary of the calibration standard x and y value readings taken by an analytical instrument.

Calibration standard summary 32 includes the following parameters: Concentration column 58, Intensity column 60, Calculated column 62, Residual column 64, and Normalized Residual column 66 ("Norm Resid.") (FIG. 3). Accordingly, the parameters may change according to the specifications and requirements of the application for which the exemplary embodiment of the present invention is being used.

Figure 4:
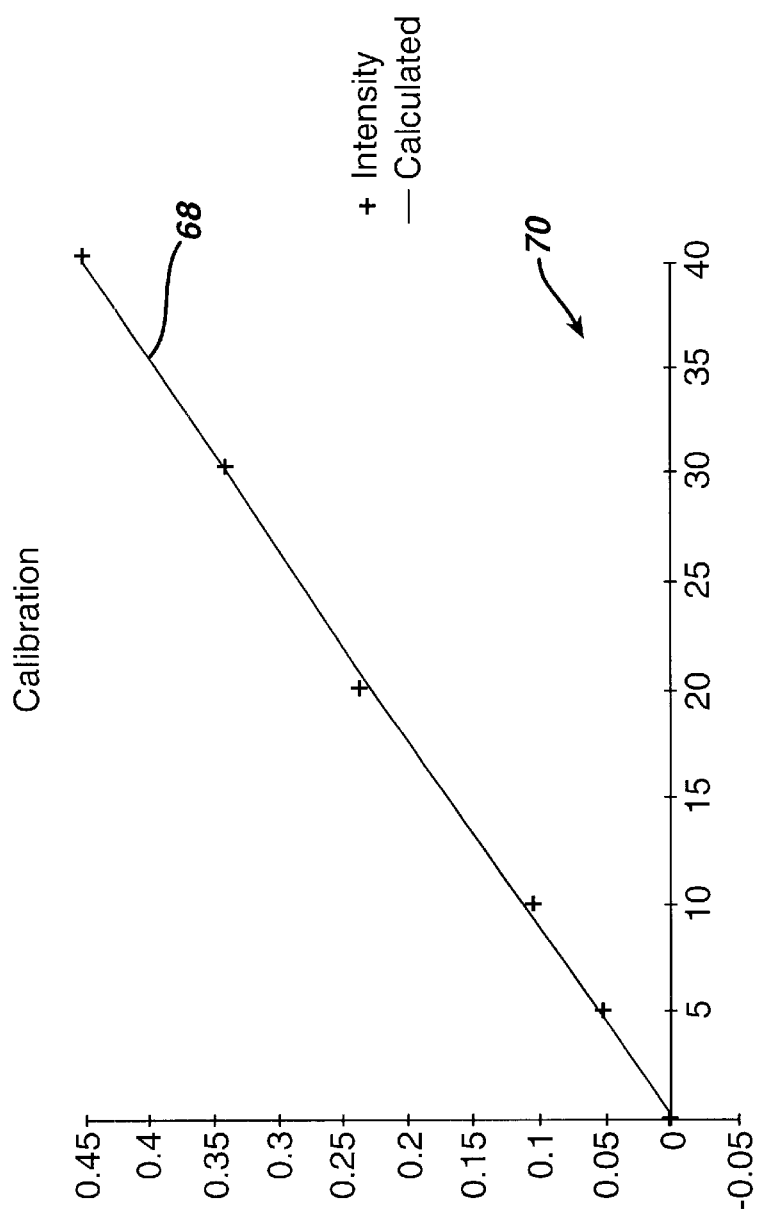
FIG. 4 is a graph of the calibration data shown in FIG. 3.

Referring now to FIG. 4, after each pair of calibration input characteristic 18 and calibration output measurement 20 for the calibration samples is entered, calculator 10 calculates a linear calibration curve 68 plotted on a graph 70 using at least three pairs of calibration standard data. Linear calibration curve 68 relates calibration input characteristic 18 to calibration output measurement 20. Linear calibration curve 68 is least-squares best line fit of the calibration samples.

Figure 5:
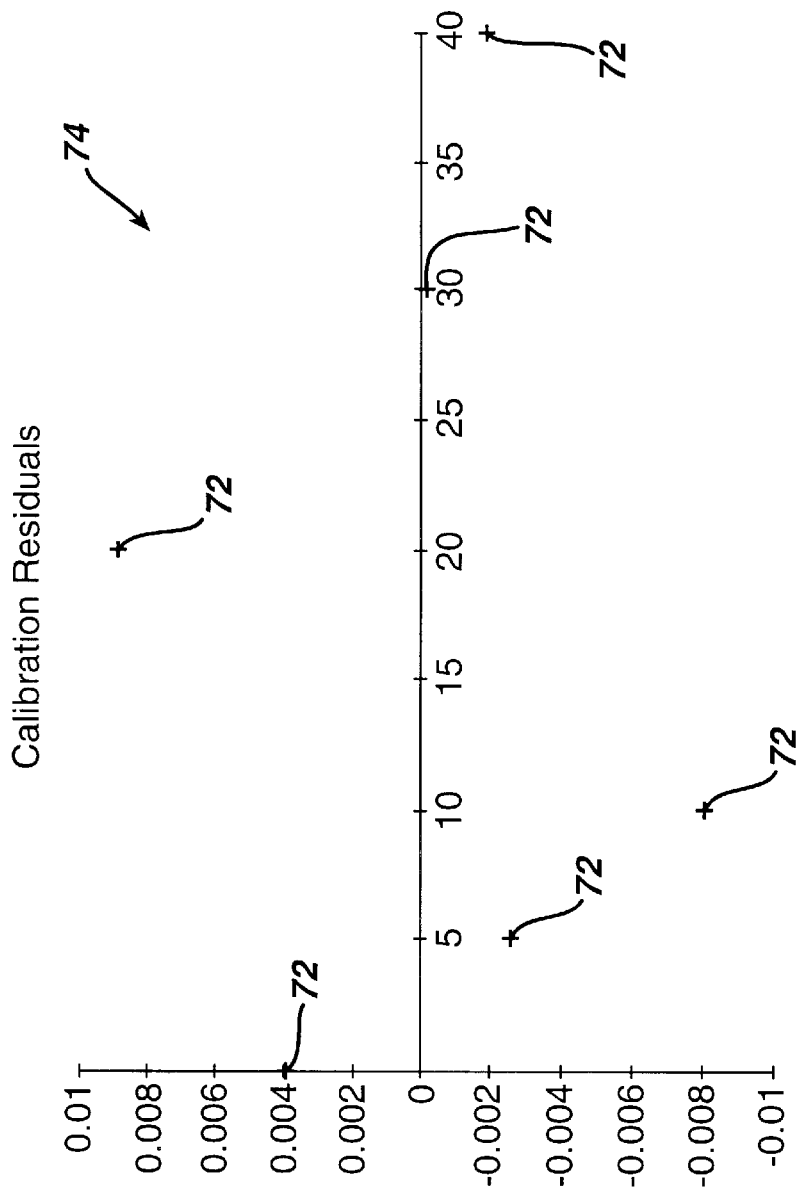
FIG. 5 is a graph of the calibration residual values shown in FIG. 3.

Referring now to FIG. 5, a calibration residual values 72 taken from the calculations for linear calibration curve 68 are plotted in graph 74 (FIG. 4). Calibration residual values 72 are included for diagnostic purposes. The calibration residual values 72 assess the quality of the linear relationship of calibration data 32. If a non-linear relationship exists, then calibration residual values 72 will form a curvature indicating a discrepancy in the linear relationship. However, if a linear relationship exists, then calibration residual values 72 are scattered around a value equal to zero.

Figure 6:
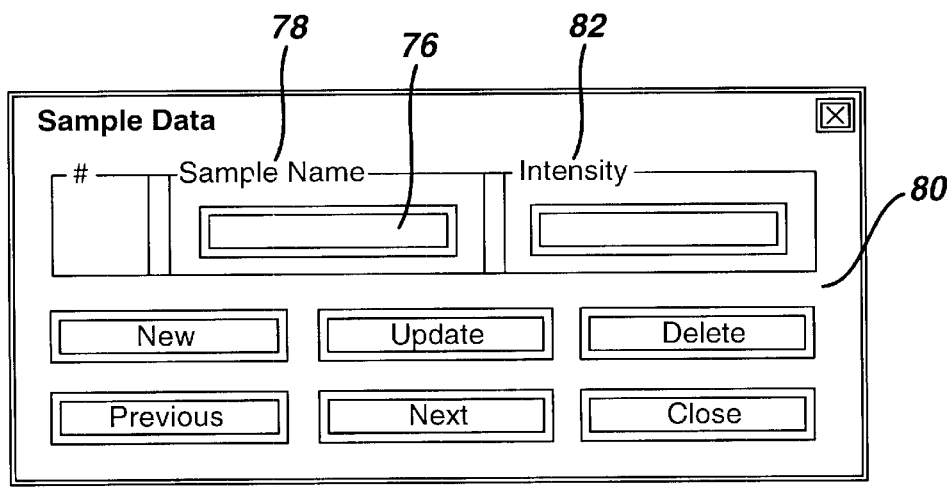
FIG. 6 is a sample data box of the calculator.

After calculator 10 plots linear calibration curve 68 and calibration residual values 72, user is prompted for an unknown sample output measurement 76 and a sample name 78 in third dialog box 80 (FIG. 6). User assigns a reference 82 for unknown sample output measurement 48. In this example, reference 82 specifies the "Intensity" readings or y-value of unknown sample output measurement 76.

Referring now to FIG. 7, a sample data chart 88 displays a calibration parameter list 90 and sample data 92. Calibration parameter list 90 contains the following parameters: Standard Error 94, Slope 96, Intercept 98, Average x 100, and the summation of the difference between x-value of each calibration sample and average x-value of the calibration samples squared 102 (summation). Sample data 92 contains the following information: Number of Sample Replicates column 104 ("N"), Sample column 106, Intensity column 108, Concentration column 110, Standard Error column 112, 90% Prediction Interval column 114 ("90% PI"), 95% Prediction Interval column 116 ("95% PI"), and 99% Prediction Interval column 118 ("99% PI"). Concentration column 110 contains a back-calculated x-value 120 for the specified unknown samples. Prediction Interval columns 114, 116 and 118 contain prediction interval values 122 for the specified unknown samples. Accordingly, the parameters may change according to the specifications and requirements of the application for which the exemplary embodiment of the present invention is being used.

Next, calculator 10 calculates a back-calculated x-value 120 using unknown sample output measurement 76 and calibration data listed in calibration standard summary 32. Back-calculated x-value ($S_x$) 120 is calculated using the following equation:

$$X = (Y\text{-intercept})/\text{slope}$$

where Y is an unknown sample output measurement 86. The intercept value is taken from an entry in Intercept column 48 corresponding with unknown sample output measurement 86. The slope value is taken from an entry in Slope column 38 corresponding with unknown sample output measurement 86.

The error term is calculated from the equation:

$$s_x = \frac{\sigma}{m}\sqrt{\frac{1}{N} + \frac{1}{M} + \frac{(X-\bar{x})^2}{\sum(x_i-\bar{x})^2}}$$

where σ (sigma) is the true product/process standard deviation or the standard error of the calibration fit. It is a combination of all influencing factors, including measurement, people, raw materials, etc. To find the true value of σ might take never-ending data collection. As a result, σ is estimated from sample data. N is the number of replicate readings of samples. Additional data, or larger the N value, will tighten the confidence interval and give a stronger and more accurate and precise representation of σ. M is the number of calibration samples. $x_i$ is the x value of M different calibrations samples. x is the average x value of the calibration samples.

The error analysis equation shown above was taken from chapter 2 of
*Applied Linear Statistical Models* by J. Neter, M. H. Kutner, C. J. Nachtsheim and W. Wasserman, Irwin, Chicago, 1996.

Prediction intervals are calculated by inflating $S_x$ 120 by the appropriate t-distribution value. Prediction interval value 122 is calculated using the following equation:

$$X \pm t_{(1-\alpha/2(n-2))} S_x$$

where X is the back-calculated x-value or unknown sample input measurement. n is the number of pairs of calibration data, which comprises the observed values of the calibration standards. t is the upper 1-α/2 percentile of the t-distribution with n-2 degrees of freedom for a 95% prediction interval when α is set to 0.05. α is set to 0.01 for 99% prediction interval. The t-distribution value represents a probability value that is used to determine confidence intervals and comparison statements about the mean value(s) of the population sample or in this case the mean value(s) of the sample readings. The % confidence interval, such as 95% PI and 99% PI, for a specified parameter consists of a lower and an upper limit. The higher the confidence level the wider the confidence interval. The probability that the confidence level is incorrect, that is, does not contain the true parameter value, is expressed as α and assigned a value of either 0.05 or 0.01. The calculated error and degrees of freedom are statistical notations taken from Neter, et al.

The confidence level on the mean tightens by a factor of two for approximately every fourfold increase in the sample size. The sample size is selected upon both statistical and business criteria. Business criteria includes cost, time and available resources. However, business factors should be weighed after the "statistically correct" sample size is determined. Statistical criteria are related to discovering the difference between a sample characteristic and reality. Detection of smaller practical differences will require larger sample sizes. The sample size has little effect on the computation of the statistical values, which is the focus of the present invention. A best estimate mean can be formed with two observations as well as with one hundred observations. The increase in sample size does affect the confidence interval. Thus, the desired width of the confidence interval is what really determines the sample size. Usually, the detection of the true mean value is desired to be within some delta (δ) of the true mean ($\mu$), hence the confidence interval on $\mu$ is usually used to compute an appropriate sample size. An overview of the use of confidence intervals and population sizes in the Six Sigma program is presented by Mario Perez-Wilson in "Six Sigma—Understanding the Concept, Implications and Challenges", Mario Perez-Wilson and Advanced Systems Consultants, 1999, and by Forrest W. Breyfogle III in "implementing Six Sigma—Smarter Solutions Using Statistical Methods", John Wiley & Sons, 1999.

The apparatus described above may use a hardware implementation or a combination of hardware and software. Attached is the macro listing using Microsoft Excel Implementation for a software implementation of part of the apparatus.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for calculating at least one confidence interval, the method comprising:
   activating a calculator;
   entering at least three pairs of calibration data;
   specifying at least one reference for said at least three pairs of calibration data;
   generating a list of calibration standard plot data and a calibration standard summary from said at least three pairs of calibration data;
   calculating at least one linear calibration curve derived from said at least three pairs of calibration data;
   calculating at least one residual calibration value plot derived from said at least three pairs of calibration data;
   entering at least one unknown sample output measurement;
   calculating at least one back-calculated unknown sample input measurement; and
   calculating at least one confidence interval for said at least one back-calculated unknown sample input measurement.

2. A method recited in claim 1, wherein said calculator is a macro of a spreadsheet program.

3. A method recited in claim 1, wherein said at least three pairs of calibration data define at least one calibration input characteristic and at least one calibration output measurement.

4. A method recited in claim 1, wherein said calculating said back-calculated unknown sample input measurement further comprises using an unknown sample output measurement and said calibration data to calculate said back-calculate unknown sample input measurement.

5. An apparatus for calculating error analysis, the apparatus comprising a set of instructions for calculating at least one confidence interval value, wherein said set of instructions comprises:
   an instruction to input at least one x-value and at least one y-value corresponding with at least three pairs of calibration standard data;
   an instruction to calculate at least one least-squares best line fit derived from the at least three pairs of calibration standard data;
   an instruction to calculate at least one set of calibration residual values from said at least three pairs of calibration standard data;
   an instruction to input at least one y-value corresponding with at least one unknown sample;
   an instruction to calculate at least one back-calculated x-value for said at least one unknown sample; and
   an instruction to calculate at least one confidence interval value for said at least one back-calculated x-value.

6. An article of manufacture comprising:
   a computer usable medium having set of instruction means embodied therein for calculating at least one confidence interval value for at least one back-calculated x value for at least one set of unknown sample data using a set of instructions, an article of manufacturing comprising:
      set of instruction means for causing the set of instructions to prompt a user to input at least three pairs of values based on at least three pairs of calibration standard data;
      set of instruction means for causing the set of instructions to calculate at least one set of least-squares best line fit from said at least three pairs of calibration standard data;
      set of instruction means for causing the set of instructions to calculate at least one set of calibration residual values from said at least three pairs of calibration standard data;
      set of instruction means for causing the set of instructions to prompt a user to input at least one unknown sample output measurement based on at least one set of unknown sample data;
      set of instruction means for causing the set of instructions to calculate said at least one back-calculated x-value for said at least one set of unknown sample information; and
      set of instruction means for causing the set of instructions to calculate at least one confidence interval value based on said at least one back-calculated x-value.

7. A system comprising a computer usable medium having a set of instructions for calculating at least one confidence interval value, wherein the set of instructions comprises:
   an instruction to prompt a user to input at least three pairs of values based on at least three pairs of calibration standard data;

an instruction to prompt a user to input at least one value based on at least one set of unknown sample information;

an instruction to plot at least one set of least-squares best fit data derived from said at least three pairs of calibration standard data;

an instruction to plot at least one set of calibration residual values derived from said at least three pairs of calibration standard data;

an instruction to calculate at least one back-calculated x-value for said at least one set of unknown sample data; and an instruction to calculate at least one error analysis value based on said at least one back-calculated x-value.

8. A program storage device readable by machine, tangibly embodying a program of instructions executable by the machine to perform method steps for calculating at least one confidence interval, comprising:

activating a calculator;

entering at least three pairs of calibration data;

plotting at least one linear calibration curve derived from said three pairs of calibration data;

plotting at least one calibration residual value plot derived from said three pairs of calibration data;

calculating at least one back-calculated unknown sample input measurement; and calculating at least one confidence interval for said at least one back-calculated unknown sample input measurement.

* * * * *